United States Patent [19]
Ueda et al.

[11] Patent Number: 6,075,579
[45] Date of Patent: Jun. 13, 2000

[54] LIQUID CRYSTAL DISPLAY DEVICE USING A HOLOGRAM, HOLOGRAM SCATTER PLATE, AND PROCESS OF REPLICATING A DIFFUSE REFLECTION TYPE HOLOGRAM

[75] Inventors: Kenji Ueda; Hideyuki Iriyama; Akio Morii, all of Tokyo, Japan

[73] Assignee: Dai Nippon Printing Co., Ltd., Tokyo, Japan

[21] Appl. No.: 08/758,093

[22] Filed: Nov. 27, 1996

[30] Foreign Application Priority Data

| Nov. 30, 1995 | [JP] | Japan | 7-312361 |
| Nov. 30, 1995 | [JP] | Japan | 7-312362 |
| Dec. 12, 1995 | [JP] | Japan | 7-322973 |
| Jan. 22, 1996 | [JP] | Japan | 8-008531 |
| Jan. 22, 1996 | [JP] | Japan | 8-008532 |

[51] Int. Cl.[7] .......................... G02F 1/1335; G02B 5/32
[52] U.S. Cl. ...................... 349/64; 349/112; 349/106; 359/15
[58] Field of Search ............................. 349/64, 112, 106; 359/15, 16, 599

[56] References Cited

U.S. PATENT DOCUMENTS

| 4,239,349 | 12/1980 | Scheffer | 349/112 |
| 4,285,029 | 8/1981 | McCoy | 362/84 |
| 4,660,936 | 4/1987 | Nosker | 349/112 |
| 4,984,872 | 1/1991 | Vick | 349/112 |
| 5,046,793 | 9/1991 | Hockley et al. | 359/12 |
| 5,333,073 | 7/1994 | Suzuki | 349/59 |
| 5,506,701 | 4/1996 | Ichikawa | 349/15 |
| 5,629,784 | 5/1997 | Abileah et al. | 349/112 |
| 5,659,408 | 8/1997 | Wenyon | 349/64 |
| 5,691,790 | 11/1997 | Havens et al. | 349/113 |
| 5,721,600 | 2/1998 | Sumiyoshi et al. | 349/119 |
| 5,721,630 | 2/1998 | Horner et al. | 359/15 |
| 5,745,203 | 4/1998 | Valliath et al. | 349/113 |
| 5,812,229 | 9/1998 | Chen et al. | 349/113 |

*Primary Examiner*—William L. Sikes
*Assistant Examiner*—Tarifur R. Chowdhury
*Attorney, Agent, or Firm*—Sughrue, Mion, Zinn, Macpeak & Seas, PLLC

[57] ABSTRACT

The invention relates to a liquid crystal display device which enables a visual field range to be made wide and luminance drops to be reduced, so that bright displayed images can be presented, and provides a liquid crystal display device comprising, in order from a side of backlight 11, backlight 11, scatter plate 12, and liquid crystal element 20, wherein a transmission type of hologram scatter plate 13 is located in front of a display surface of liquid crystal display element 20. Hologram scatter plate 13, because of having been fabricated by means of single-step or two-step exposure, enables light more or less scattered through scatter plate 12 to be limitedly scattered within a given wide visual field range, so that bright displayed images can be presented over a wide visual field range yet with a reduced luminance drop. Scatter plate 12 may be omitted.

10 Claims, 12 Drawing Sheets

LIQUID CRYSTAL DISPLAY DEVICE USING A HOLOGRAM, HOLOGRAM SCATTER PLATE, AND PROCESS OF REPLICATING A DIFFUSE REFLECTION TYPE HOLOGRAM

BACKGROUND OF THE INVENTION

The present invention relates generally to a liquid crystal display device, and more specifically to a liquid crystal display device using a hologram diffuse plate. The present invention is also concerned with a hologram scatter plate used for liquid crystal display devices, etc., and process of replicating a such a diffuse reflection type hologram.

Referring here to a direct-view type of liquid crystal display device, a scatter plate 12 is generally located on the side of a liquid crystal display element 20 opposite a backlight 11 to diffuse light emanating therefrom, as shown in FIG. 18, thereby widening a range capable of viewing an image displayed thereon (a visual field range).

A problem with this system is, however, that the efficiency of utilization of light is not high due to the use of a general scatter plate formed of frosted glass, and the angle of field is limited as well. The angle of field may be made wide by use of a plurality of scatter plates, but this offers a problem or gives rise to some considerable luminance drop.

A self-luminous type backlight consumes a large amount of power, and causes considerable battery life reduction when used with laptop computers, etc.

SUMMARY OF THE INVENTION

In view of such problems associated with the prior art, an object of the present invention is to provide a liquid crystal display device which has a wide visual field range and reduced luminance drops, so that bright displayed images can be presented.

Another object of the present invention is to provide a liquid crystal display device which uses a diffuse reflection type hologram for backlighting so that bright displays can be presented in the light without recourse to any self-luminous backlight. Yet another object of the present invention is to provide a liquid crystal display device which can be used in combination with a self-luminous type backlight, so that battery life can be extended by turning off the self-luminous type backlight or using the self-luminous type backlight at a reduced luminance.

A further object of the present invention is to provide a hologram scatter plate enabling bright displayed images to be presented over a wide range of wavelengths and viewing angle hardly achievable with conventional hologram systems.

A still further object of the present invention is to provide a process of fabricating, by replication, a large diffuse reflection type hologram without joints or recorded joints, which is compatible with increased size and improved quality in connection with backlights, projector screens, combiners, etc. for liquid crystal display devices.

To accomplish the aforesaid objects, the present invention provides a liquid crystal display device using a hologram, characterized in that a liquid crystal display element is provided on a display surface side thereof with a diffuse transmission type hologram capable of diffusing and transmitting light incident from a specific direction only in a direction defined as a viewing region.

In this case, a scatter plate may be located between the liquid crystal display element and a backlight.

The present invention also provides a liquid crystal display device using a hologram, characterized in that between a liquid crystal display element and a backlight there is located a diffuse transmission type hologram capable of diffusing and transmitting light incident from a specific direction only in a direction defined as a viewing region.

In these cases, it is desired that the diffuse transmission type hologram has a property of diffusing and transmitting light only in a direction defined as a viewing region within a plurality of wavelength regions of different colors.

Further, the present invention provides a liquid crystal display device using a hologram, characterized in that a liquid crystal display element is provided on a back surface side thereof opposite to a display surface side thereof with a diffuse reflection type hologram capable of diffusing and reflecting light incident from a specific direction only in a direction defined as a viewing region.

In this case, a diffuse reflection plate or a reflector plate may be located on the back surface side of the diffuse reflection type hologram.

When a TN liquid crystal cell is used as the liquid crystal display element, the diffuse reflection type hologram enables diffuse reflection to occur within a range wherein the contrast of the liquid crystal cell is at least 2. When an STN liquid crystal cell is used as the liquid crystal display element, the diffuse reflection type hologram enables diffuse reflection to occur within a range wherein the contrast of the liquid crystal cell is at least 2.

More illustratively, when a TN liquid crystal cell is used as the liquid crystal display element, it is desired that the diffuse reflection type hologram enable light incident thereon from above and at an angle of about 20° with respect to a normal line thereof to be diffused and reflected within a range defined by an upward angle about 10°, a downward angle of about 40°, and breadth-wise angles of about 60°. When an STN liquid crystal cell is used as the liquid crystal display element, it is desired that the diffuse reflection type hologram enable light incident thereon from above and at an angle of about 20° with respect to a normal line thereof to be diffused and reflected within a range defined by an upward angle about 20°, a downward angle of about 30°, and breadth-wise angles of about 3°.

A self-luminous type backlight unit may be located on the back surface side of the diffuse reflection type hologram.

To accomplish the aforesaid objects, the present invention provides a hologram scatter plate which reflects incident light in a direction different from a direct reflection direction thereof, characterized in that a transmission type hologram layer and a back side layer are stacked together in the described order as viewed from an incident side thereof.

In accordance with this aspect, there are three cases where the transmission type hologram layer has both a diffusion function and a diffraction function while the back side layer is a mirror reflection layer; the transmission type hologram layer has diffraction function while the back side layer has a diffuse reflection function; and the transmission type hologram layer for both a diffusion function and diffraction function while the back side layer has diffuse reflection function.

The transmission type hologram layer used may have a diffraction function, or a diffusion function and diffraction function, with respect to a plurality of different wavelengths.

The present invention also includes a liquid crystal display device having any one of the aforesaid hologram scatter plates located on a back surface side of a liquid crystal display element.

To accomplish the aforesaid objects, the present invention further provides a diffuse reflection type hologram replication process, characterized in that while a photosensitive material film is slid on a fixed diffuse reflection type hologram plate in contact relation thereto, the hologram plate is irradiated from the photosensitive material film with a light beam of linear shape in section that becomes wide in a widthwise direction of the film, so that a diffuse reflection type hologram can be continuously recorded in the photosensitive material film by interference of the incident light beam with a light beam reflected and diffracted by the diffuse reflection type hologram plate.

In this case, it is preferable that the diffuse reflection type hologram plate is fixed on the surface of a transparent rod-like member rounded at at least both edges thereof. Such a transparent rod-like member may be exemplified by a semicylindrical member.

It is also desired that a combined index matching and lubricating liquid be contained between the diffuse reflection type hologram plate and the photosensitive material film.

The light beam of linear shape in section used may be exemplified by a light beam that diverges in its linear direction alone.

According to one inventive liquid crystal display device using a hologram wherein on a display surface side of a liquid crystal display element or between a liquid crystal display element and a backlight there is provided a diffuse transmission type hologram capable of diffusing and transmitting light incident from a specific direction only in direction defined as a viewing region, it is possible to make wide a visual field region where displayed images can be observed and reduce luminance drops, so that bright displayed images can be presented.

According to another inventive liquid crystal display device using a hologram wherein on a back surface side of a liquid crystal display element opposite to a display surface side thereof there is provided a diffuse reflection type hologram capable of diffusing and reflecting light incident from a specific direction only in a direction defined as a viewing region as mentioned above, it is possible to present bright displays in the light without recourse to any self-luminous type backlight.

According to the inventive hologram scatter plate wherein a transmission type hologram layer and a back side layer are stacked together in the described order, it is possible to limit the direction of diffraction and scattering by means of the transmission hologram and increase reflectance over a wide wavelength region by means of the back side layer, so that diffused light having high luminance can be obtained over a wide wavelength and viewing angle range, making bright displays, etc. possible.

According to the inventive diffuse reflection type hologram replication process wherein while a photosensitive material film is slid on a fixed diffuse reflection type hologram plate in contact relation thereto, the hologram plate is irradiated from the photosensitive material film with a light beam of linear shape in section that becomes wide in a widthwise direction of the film, so that a diffuse reflection type hologram can be continuously recorded in the photosensitive material film by interference of the incident light beam with a light beam reflected and diffracted by the diffuse reflection type hologram plate, it is possible to easily fabricate, with no need of using any large hologram plate, a large yet continuous film form of diffuse reflection type hologram without joints or recorded joints, which has high reflectance and quality, and so is best suited for use with backlights, projector screens, combiners, etc. for liquid crystal display devices.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

Embodiments of the inventive liquid crystal display device using a hologram, the inventive hologram scatter plate and the inventive process of fabricating a diffuse reflection type hologram will now be explained.

Figure 1:
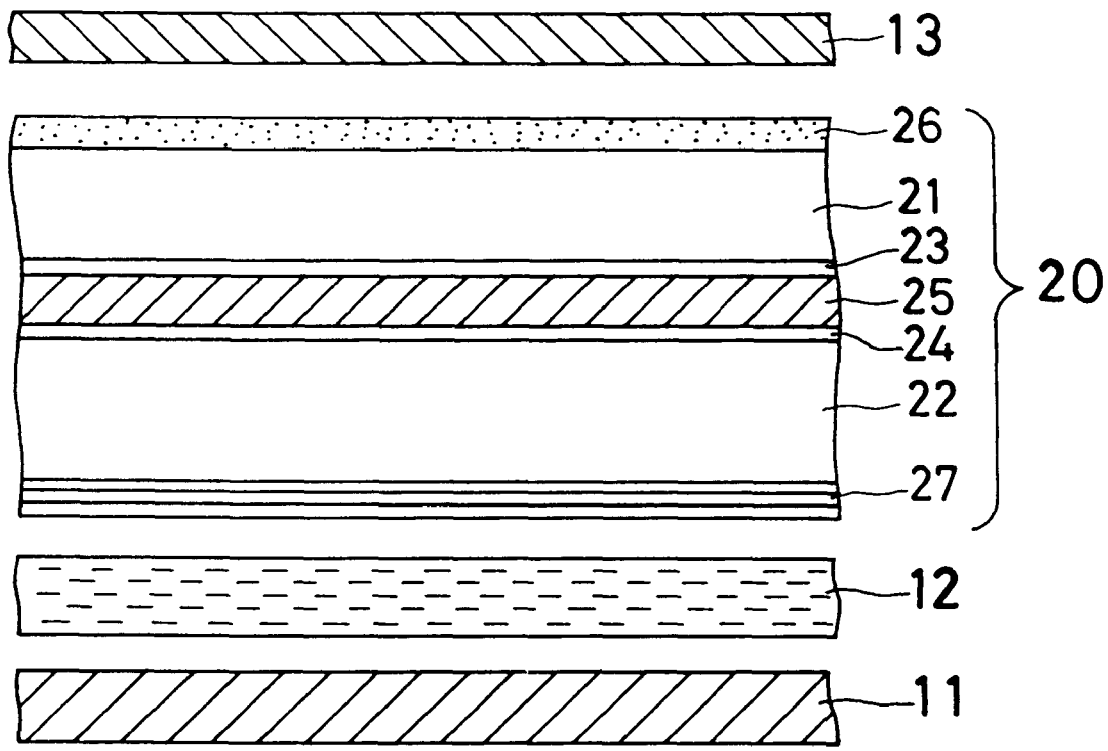
FIG. 1 is a sectional schematic of one embodiment of the liquid crystal display device according to the present invention.
Figure 18:
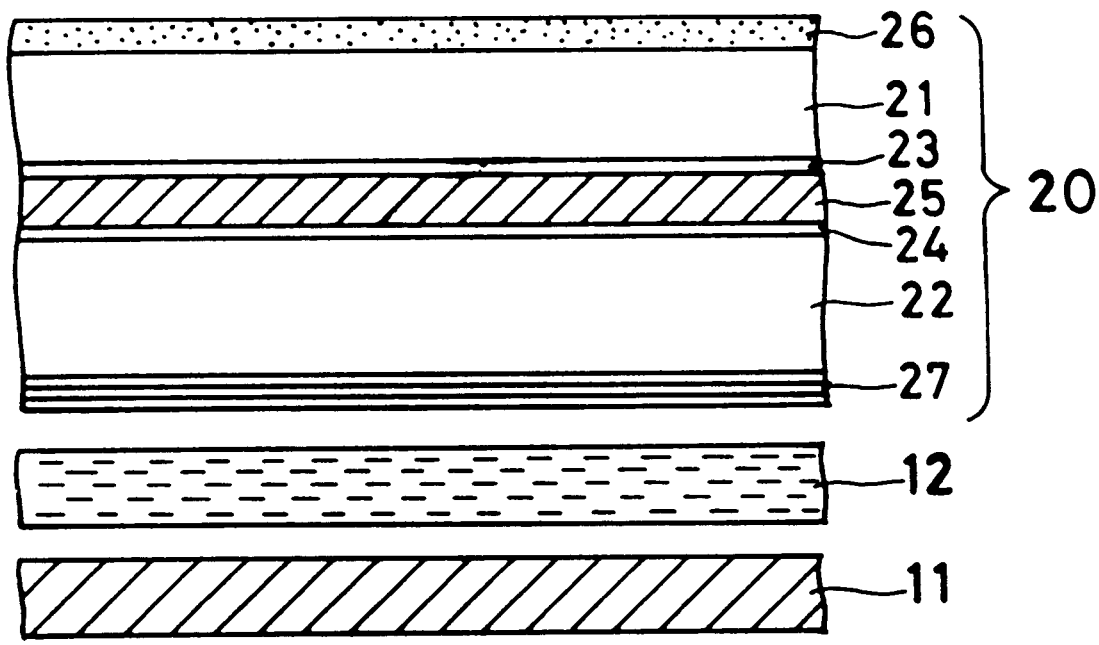
FIG. 18 is a sectional schematic of a conventional liquid crystal display device.

FIG. 1 is a sectional schematic showing one embodiment of the liquid crystal display device according to the present invention, which is similar to a conventional device shown in FIG. 18 in that a backlight 11, a scatter plate 12 and a liquid crystal display element 20 are located in the described order, as viewed from the side of the backlight 11. According to the present invention, a transmission type of hologram scatter plate 13 is located in front of a display surface of the liquid crystal display element 20. The hologram scatter plate 13 is fabricated by means of single-step or two-step exposure techniques that will be described later. The thus produced hologram scatter plate enables light more or less scattered through the scatter plate 12 to be limitedly scattered within a given wide visual field range. Accordingly, bright displayed images can be presented over a wide visual field range with little or no luminance reduction. The liquid crystal display element 20 used herein, for instance, comprises a twisted nematic or other liquid crystal layer 25 sandwiched between two glass substrates 21 and 22, one glass substrate 22 having a uniform opposite electrode 24 on its inner surface and the other glass substrate 21 having on its inner surface independent display electrodes 23 for each liquid crystal cell (R, G, B), and a color filter and a black matrix, although not illustrated. The electrodes 23 and 24 are also provided with orientation layers on their sides opposite to the liquid crystal layer, although again not illustrated. Further, the glass substrate 21 is provided with a polarizing plate 26 on its outer surface while the glass substrate 22 located on the viewing side is provided with a polarizing plate 27 on its outer surface, with their transmission axes perpendicular to one another, for instance. Voltage applied between the transparent display electrodes of the liquid crystal display element 20 is controlled per pixel to change the state of transmission, thereby displaying color images. It is noted here that the hologram scatter plate 13 may have been removed from the position shown in FIG. 1, and alternatively located between the backlight 11 and the liquid crystal element 20.

How to make the transmission type hologram scatter plate 13 used in the instant embodiment by means of holography will now be explained.

The visual field range of a liquid crystal display device is dependent on the angle of diffusion of the hologram scatter plate 13. The smaller the angle of diffusion, the more difficult it is to look at a displayed image. To eliminate this problem, a hologram is recorded in a desired preset visual field range only where scattering and diffraction take place.

Single-Step Exposure

Figure 2:
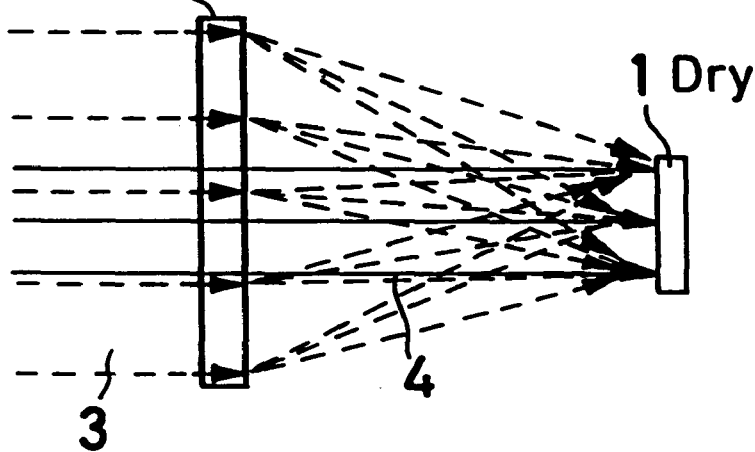
FIG. 2 illustrates one optical layout for recording a hologram scatter plate by a single-step exposure technique.

FIG. 2 is a schematic illustrative of a holographic layout designed to set a visual field (range) in the vertical direction of the hologram scatter plate 13. A scatter plate 2 is irradiated with laser light 3 from its back side to define scattered light as object light and transmitted light without being scattered as reference light 4, which are then allowed to interfere with each other in a hologram dry plate 1 for recording, thereby making the hologram scatter plate 13. In this case, the scatter plate 2 must be larger than the hologram dry plate 1, because the visual field region (range) of the hologram scatter plate 13 located at the position of the hologram dry plate 1 is then defined by the region of the scatter plate 2.

Figure 3:
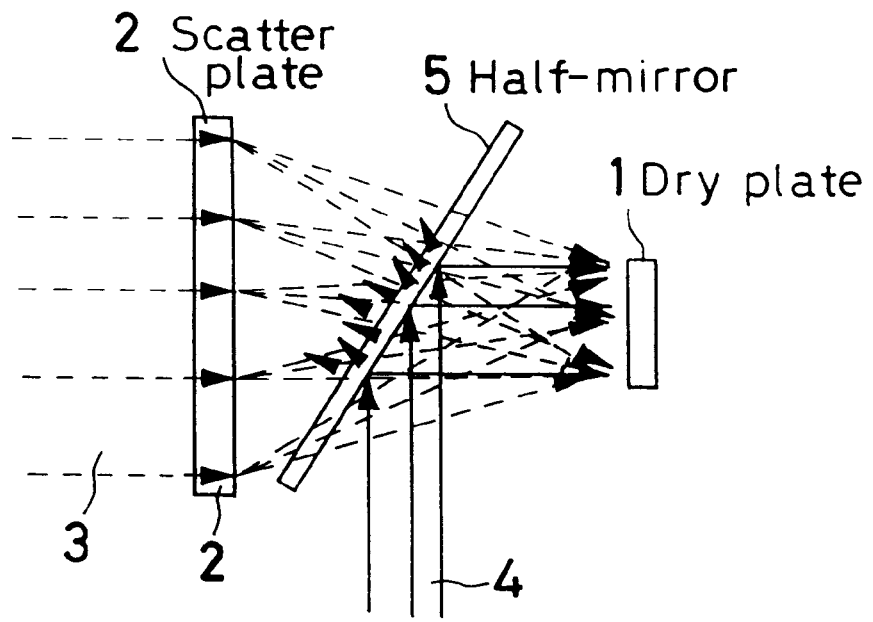
FIG. 3 illustrates another optical layout for recording a hologram scatter plate by the single-step exposure technique.

FIG. 3 is again a schematic illustrative of a holographic layout designed to set a visual field (range) in the vertical direction of the hologram scatter plate 13. A scatter plate 2 is irradiated with laser light 3 from its back side to define scattered light as object light and light incident via a half mirror located between the scatter plate 2 and a hologram dry plate 1 as reference light 4, which are then allowed to interfere with each other in the hologram dry plate 1 for recording, thereby making the hologram scatter plate 13. In this case, too, the scatter plate 2 must be larger than the hologram dry plate 1, because the visual field region (range) of the hologram scatter plate 13 located at the position of the hologram dry plate 1 is defined by the region of the scatter plate 2. The layout shown in FIG. 3 is advantageous over the layout shown in FIG. 2 because it is easier to regulate the light quantity ratio between object light and reference light, and increase the parallelism of reference light 4.

Figure 4:
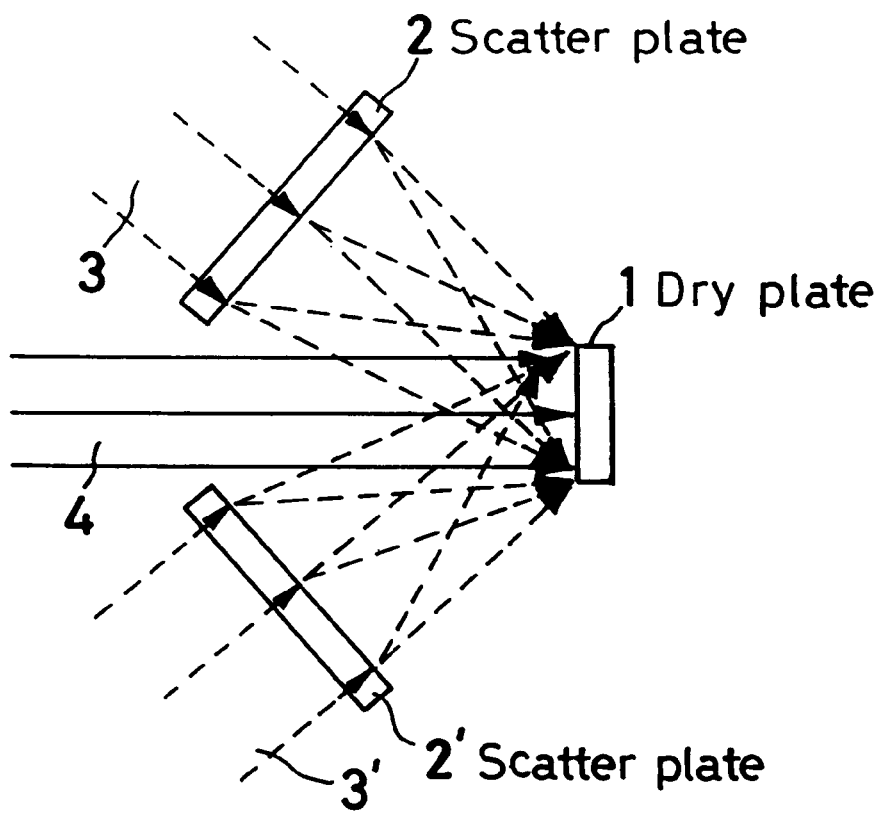
FIG. 4 illustrates yet another optical layout for recording a hologram scatter plate by the single-step exposure technique.

FIG. 4 is a schematic illustrative of a holographic layout designed to determine a visual field in an oblique direction with respect to a hologram scatter plate 13. One or more scatter plates 2, 2' are located at an off-axis position with respect to a hologram dry plate 1. The scatter plates 2 and 2' are then irradiated with laser light 3 and laser light 3' from their back sides, from which scattered light or object light is obliquely incident on the hologram dry plate 1 and reference light 4 is straightforward incident on the hologram dry plate 1. The object light and reference light are then allowed to interfere with each other in the hologram dry plate 1 for recording, thereby making the hologram scatter plate 13. In this case, too, the scatter plates 2 and 2' must be larger than the hologram dry plate 1, because the visual field region (range) of the hologram scatter plate 13 located at the position of the hologram dry plate 1 is defined by the regions of the scatter plates 2 and 2'. In the layout shown in FIG. 4, exposure is done concurrently with the scatter plates 2, 2'. It is to be understood, however, that recording may be carried out by means of multi-exposure while the scatter plates 2, 2' are located at the specified positions in a given time interval.

Two-Step Exposure

Figure 5A:
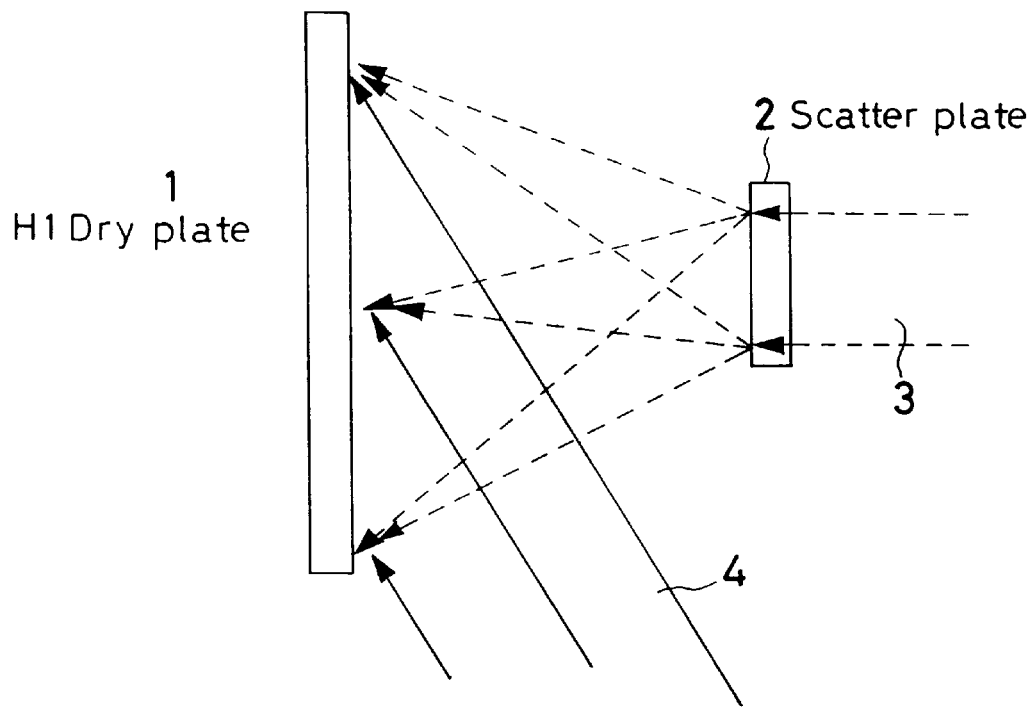
FIG. 5(a) and FIG. 5(b) illustrate an optical layout for recording a hologram scatter plate by a two-step exposure technique.

According to this process, an intermediate hologram H1 is first recorded, and the thus recorded intermediate hologram H1 is then used to record a hologram scatter plate 13 that is the end hologram H2. As shown in FIG. 5(a), a scatter plate 2 located in opposition to a hologram dry plate 1 for the intermediate hologram H1 is irradiated with laser light 3 from its back side, from which scattered light or object light is incident on the hologram dry plate 1 and, at the same time, reference light 4 is obliquely incident on the hologram dry plate 1. Both object light and reference light are allowed to interfere with each other in the hologram dry plate 1 to record the intermediate hologram H1.

Figure 5B:
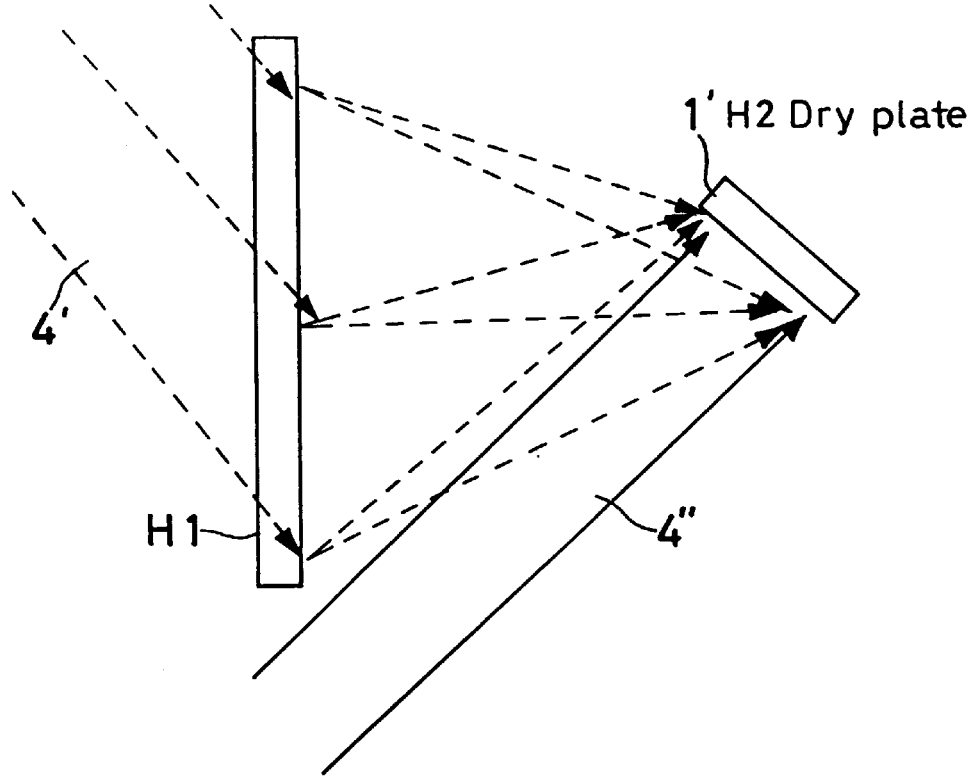

As shown in FIG. 5(b), the aforesaid intermediate hologram HI is then used to allow the reconstructing scattered light and reference light to interfere with each other in a hologram dry plate 1' for the end hologram H2 to record the hologram scatter plate 13. In this case, the region of the intermediate hologram H1 with respect to the hologram dry plate 1' defines the visual field region (range) of the hologram scatter plate 13 located at the position of the hologram dry plate 1'. Recording is carried out by irradiating the intermediate hologram H1 using, as reconstructing illumination light, light 4' that is conjugate with respect to reference light 4 used for recording the intermediate hologram H1. The thus scattered light or object light is incident on the hologram dry plate 1' simultaneously with the straightforward incidence of reference light 4" thereon, so that both object light and reference light can interfere with each other in the hologram dry plate 1' to obtain the end hologram scatter plate 13. It is here to be noted that, as is the case with the aforesaid single-step exposure, three processes may be envisaged for reference light 4" for making the end hologram H2 (FIGS. 2 to 4).

Illustrative examples of recording the hologram scatter plate 13 as shown in FIGS. 2 to 5 will now be explained.

Illustrative Example 1

A hologram photosensitive material (Omnidex 352 made by Du Pont) was applied on a glass substrate to form the hologram dry plate 1. Using the optical system shown in FIG. 2, hologram recording was carried out under the following conditions:

Size of scatter plate 2: 60 cm×80 cm

Size of hologram dry plate 1: 6 cm×8 cm

Distance between scatter plate 2 and dry plate 1: 30 cm

Laser light 3, 4: 514.5 nm wavelength (argon laser)

Exposure: 60 mJ/cm$^2$ (at an intensity of 1 mW/cm$^2$)

Intensity ratio between object light and reference light 4: approximately 1:1

The hologram recorded under such conditions was irradiated with ultraviolet radiation at 100 mJ/cm$^2$, and then heated at 120° C. for 2 hours to obtain a hologram scatter plate having a visual field in one prescribed direction and capable of achieving bright scattering.

Illustrative Example 2

A hologram photosensitive material (Omnidex 706 made by Du Pont) was applied on a glass substrate to form the hologram dry plate 1. Using the optical system shown in FIG. 3, hologram recording was carried out under the following conditions:

Size of scatter plate 2: 60 cm×80 cm

Size of hologram dry plate 1: 6 cm×8 cm

Distance between scatter plate 2 and dry plate 1: 30 cm

Laser light 3, 4: 457 nm wavelength (argon laser: B)

: 550 nm wavelength (dye laser: G)

: 647 nm wavelength (krypton laser: R)

Reference light 4: Vertical incidence/parallel light turned back by half-mirror 5

Object light: Vertical incidence/light scattered by scatter plate 2

Exposure: 60 mJ/cm$^2$ (exposure ratio between R, G and B: 3:2:1) (at an intensity of 1 mW/cm$^2$)

Intensity ratio between object light and reference light 4: approximately 1:1

The hologram recorded under such conditions was irradiated with ultraviolet radiation at 100 mJ/cm$^2$, and then heated at 120° C. for 2 hours to obtain a hologram scatter plate having a visual field in one prescribed direction and capable of achieving bright yet white scattering.

Illustrative Example 3

A hologram photosensitive material (Omnidex 352 made by Du Pont) was applied on a glass substrate to form the hologram dry plate 1. Using the optical system shown in FIG. 4, hologram multi-recording was carried out under the following conditions:

Size of scatter plates 2, 2'; 60 cm×80 cm

Size of hologram dry plate 1: 6 cm×8 cm

Distance between scatter plates 2, 2' and dry plate 1: 50 cm

Laser light 3, 4: 514.5 nm wavelength (argon laser)

Reference light 4: Vertical incidence/parallel light

Object light (first incidence): Incidence at +30°/light scattered by scatter plate 2

Object light (second incidence): Incidence at −30°/light scattered by scatter plate 2'

Exposure: First exposure at 5 mJ/cm$^2$

Second exposure atf 15 mJ/cm$^2$ (both at an intensity of 1 mW/cm$^2$)

The hologram recorded under such conditions was irradiated with ultraviolet radiation at 100 mJ/cm$^2$, and then heated at 120° C. for 2 hours to obtain a hologram scatter plate having a visual field in two prescribed directions and capable of achieving bright scattering.

Illustrative Example 4

A hologram photosensitive material (8E56 made by AGFA) was applied on a glass substrate to form a hologram dry plate. Using the optical system shown in FIG. 5(a), the intermediate hologram H1 was recorded under the following conditions:

Size of scatter plate 2: 6 cm×8 cm

Size of hologram dry plate 1: 60 cm×80 cm

Distance between scatter plate 2 and dry plate 2: 30 cm

Laser light 3, 4: 514.5 nm wavelength (argon laser)

Reference light 4: Incidence at 40°/parallel light

Object light: Vertical incidence/light scattered by scatter plate 2

Exposure: 150 µJ/cm$^2$ (at an intensity of 1 mW/cm$^2$)

Intensity ratio between object light and reference light 4: approximately 1:1

Then, a hologram pohotosensitive material (Omnidex 352 made by Du Pont) was applied on a glass substrate to form the hologram dry plate 1'. Using the optical system shown in FIG. 5(b), the end hologram H2 was recorded under the following conditions:

Size of intermediate hologram H1: 60 cm×80 cm

Size of hologram dry plate 1': 6 cm×8 cm

Distance between intermediate hologram H1 and hologram dry plate 1': 30 cm

Laser light 4', 4": 514.5 nm wavelength (argon laser)

Reference light 4": Vertical incidence/parallel light

Object light: Incidence at 40°/light reconstructed from intermediate hologram H1

Exposure: 60 mJ/cm$^2$ (at an intensity of 1 mW/cm$^2$)

Intensity ratio between object light and reference light 4": approximately 1:1

The hologram recorded under such conditions was irradiated with ultraviolet radiation at 100 mJ/cm$^2$, and then heated at 120° C. for 2 hours to obtain a hologram scatter plate having a visual field in one prescribed direction and capable of achieving bright scattering.

Another embodiment of the inventive liquid crystal display device using a hologram will now be explained.

According to the principle of this embodiment wherein the diffusion range of a diffuse reflection type hologram used as a backlight is in alignment with a practical viewing range of the liquid crystal display device, it is possible to achieve bright displays without making narrow the viewing region that the liquid crystal display device has.

Reference is first made to a diffuse reflection type hologram designed such that light incident thereon from a specific direction is diffused and reflected in only a direction defining a viewing region. A hologram having scatter function is known as a Lippmann hologram using a scatter plate in the form of a subject from an article entitled "Holographic and Interferometric Viewing Screens" (by Dietrich Meyerhofer, APPLIED OPTICS/Vol. 12, No. Sep. 9, 1973), U.S. Pat. No. 5,046,793, etc. To limit the viewing region of the diffuse reflection type hologram used in the present invention, processes ordinarily used for Lippmann holograms are used.

Figure 8:
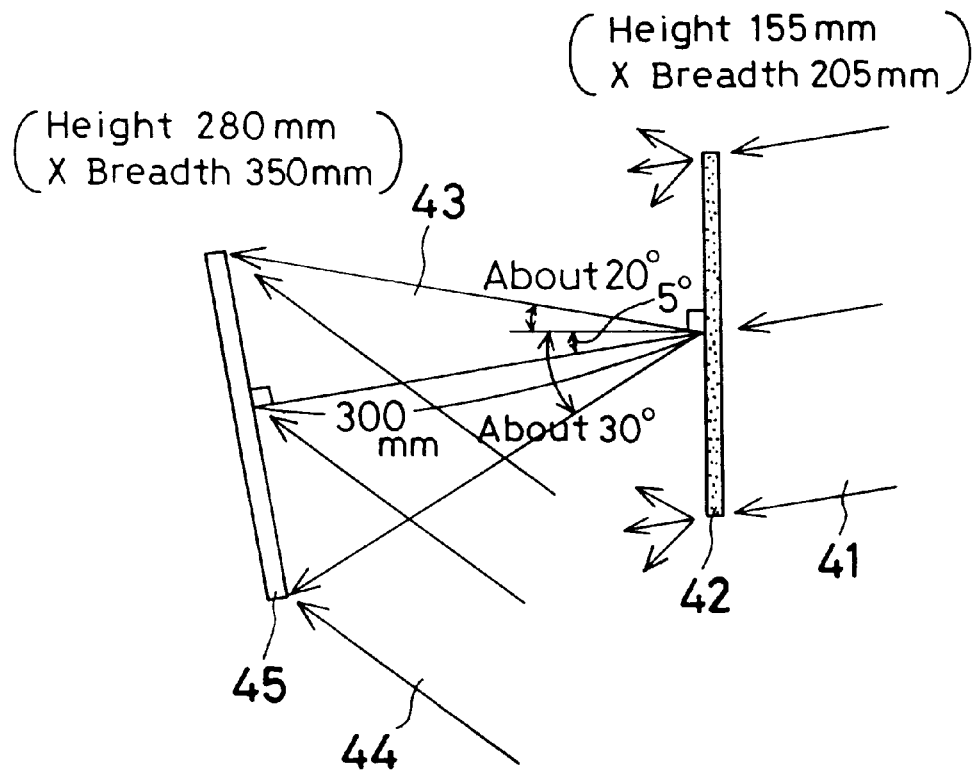
FIG. 8 illustrates an optical layout for recording an intermediate hologram for the fabrication of a diffuse reflection type hologram.

To make the diffuse reflection type hologram, a subject or diffuse plate 42 formed of frosted glass is assumed to be located at a position where a backlight forming a part of a liquid crystal display device is to be located, as shown in FIG. 8. A transmission type of hologram dry plate 45 is then located at a position to define a practical viewing region, whereupon the scatter plate 42 is illuminated from its back side with one coherent light 41 of given wavelength obtained by halving light emanating from the same light source, so that scattered light 43 leaving the front side of the scatter plate 42 or object light can be incident on the transmission type of hologram dry plate 45. At the same time, another coherent light of given wavelength emanating from the same light source or reference light 44 is incident on the dry plate 45 at a given angle from the same side as the scatter plate 43. In this way, a first hologram or transmission type hologram is recorded on the transmission type of hologram dry plate 45.

Figure 9:
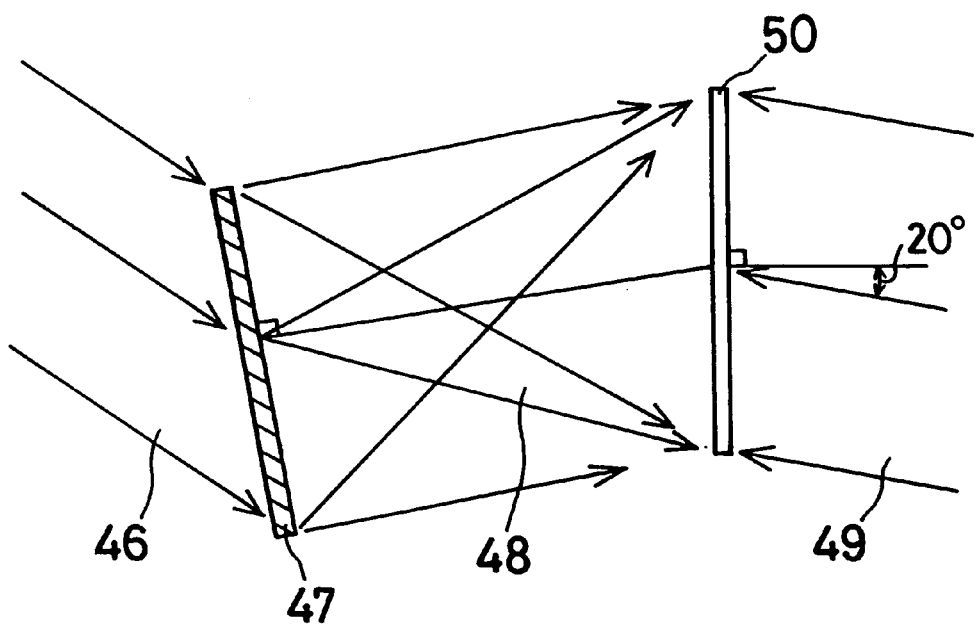
FIG. 9 illustrates an optical layout for recording a diffuse reflection type hologram using the intermediate hologram.

Then, the first hologram, shown at 47 in FIG. 9, is located at the position of the former transmission type of hologram dry plate 45, and a reflection type of hologram dry plate 50 formed of photopolymer as an example (Lippmann hologram dry plate) is now located at the position of the scatter plate 42, as shown in FIG. 9. The hologram 47 is hen irradiated with reconstructing illumination light 46 that is opposite in the direction of propagation to, and the same in wavelength as, the recording reference light 44, so that diffracted light 48 from the hologram 47 or object light can be incident on the reflection type of hologram dry plate 50. On the other hand, reference light 49 that propagates opposite to incident light assumed to be used with the liquid crystal display device is incident on the opposite side of the reflection type of hologram dry plate 50. In this way, a second hologram or reflection type hologram is recorded on the reflection type of hologram dry plate 50.

By use of this process it is possible to make the diffuse reflection type hologram with its viewing region limited to the range of the first hologram 47. A hologram obtained from this hologram plate by contact replication, too, may be used as a diffuse reflection type hologram in which the direction of diffraction (scattering) of the plate is kept intact.

More illustratively, the scatter plate 42 and reflection type of hologram dry plate 50 are each 155 mm in height and 205 mm in breadth, and the transmission type of hologram dry plate 45 (the first hologram 47) is 280 mm in height and 350 mm in breadth. While the reflection type of hologram dry plate 50 is spaced 300 mm away from, and inclined at an angle of 50 with, the scatter plate 42, the reference light 49 is incident on the reflection type of hologram dry plate 50 at a downward angle of 20° with respect to the normal line thereof, so that the light incident at an angle of about 20° from above can be uniformly diffused and reflected within a range defined by an upward angle of about 20°, a downward angle of about 30° and breadth-wise angles of about 30°. This range is in substantial coincidence with a viewing range of an STN liquid crystal display element wherein a contrast of at least 2 is obtainable. It should be here understood that by making modification to the recording layout it is possible to bring that range in substantial coincidence with a viewing range of a TN liquid crystal display element wherein a contrast of at least 2 is obtainable. In this case, light incident at an angle of about 20° from above is permitted to be uniformly diffused and reflected within a range defined by an upward angle of about 10°, a downward angle of about 40° and breadth-wise angles of about 60°.

In this connection, it is to be noted that in the process of making such a diffuse reflection type hologram as mentioned above, its optical properties may often vary due to its swelling and shrinkage although depending on the hologram photosensitive material used. However, such variations can be compensated for by making correction for recording angle and selecting recording wavelength while taking the inclination, and spacing variation of interference fringes into account.

By increasing the half bandwidth of diffraction wavelength by allowing the hologram to have a multilayer structure, or contact heating (JP-A-3-46687) of color tuning film wherein monomers, plasticizers or the like are diffused into a Lippmann hologram dry plate formed of photopolymer as an example for diffraction wavelength control, it is also possible to increase the quantity of diffused and reflected light and, hence, enhance the luminance of displays. By using a plurality of different wavelengths for one or more layers it is further possible to achieve full-color displays.

Figure 6:
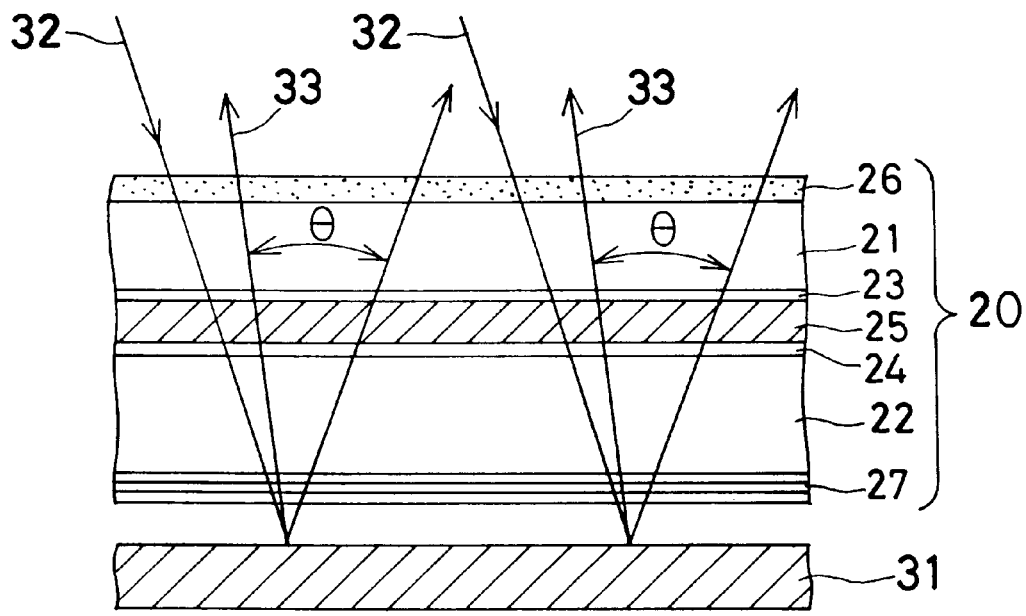
FIG. 6 is a sectional schematic of one embodiment of the inventive liquid crystal display device using a diffuse reflection type hologram.

As shown in section in FIG. 6, a diffuse reflection type hologram 31 obtained as mentioned above is located on the backlight side of a liquid crystal display device 20, thereby making it possible to construct a liquid crystal display device in which illumination light 32 incident from the display side of the liquid crystal display element 20 is diffused and reflected only within an angle range θ coincident with the viewing region of the liquid crystal display device to present bright displays even in the light without recourse to any self-luminous type backlight. The liquid crystal display element 20 used herein, for instance, comprises a twisted nematic or other liquid crystal layer 25 sandwiched between two glass substrates 21 and 22, one glass substrate 22 having a uniform opposite electrode 24 on its inner surface and the other glass substrate 21 having on its inner surface independent display electrodes 23 for each liquid crystal cell (R, G, B), and a color filter and a black matrix, although not illustrated. The electrodes 23 and 24 are also provided with orientation layers on their sides opposite to the liquid crystal layer, although again not illustrated. Further, the glass substrate 21 is provided with a polarizing plate 26 on its outer surface while the glass substrate 22 located on the viewing side is provided with a polarizing plate 27 on its outer surface, with their transmission axes perpendicular to one another, for instance. Voltage applied between the transparent display electrodes of the liquid crystal display element 20 is controlled per pixel to change the state of transmission, thereby displaying color images. It is noted here that by providing a diffuse reflection plate or reflector plate on the back side of the diffuse reflection type hologram 31 in the layout shown in FIG. 6, it is possible to achieve great luminance improvements.

Figure 7:
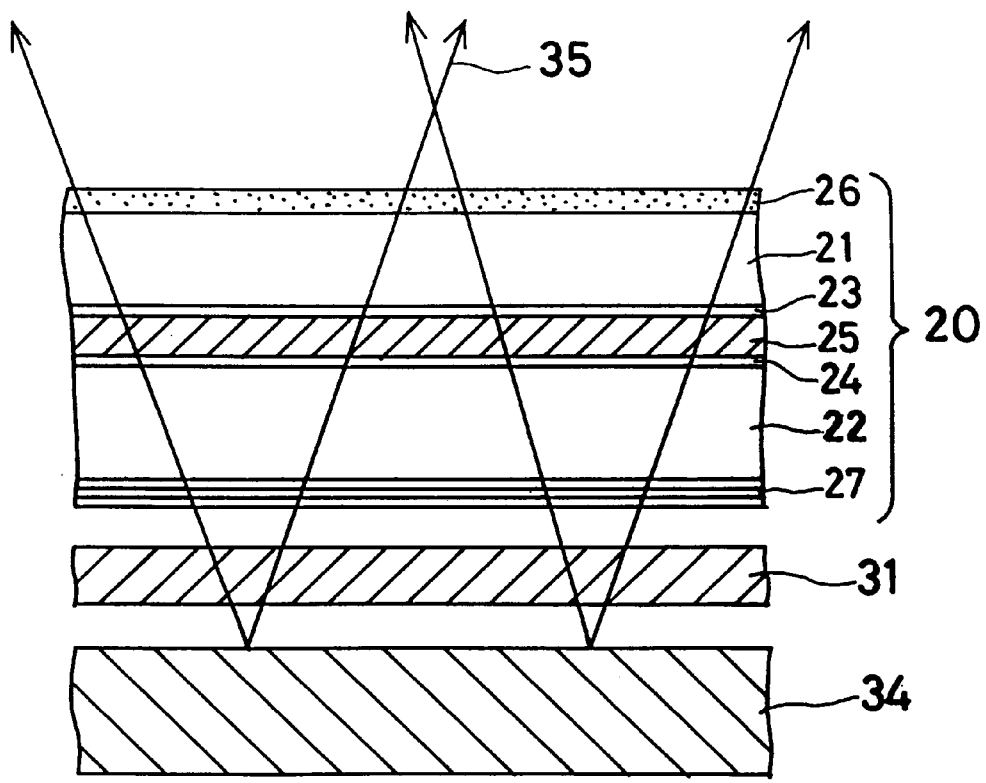
FIG. 7 is a sectional schematic of another embodiment of the inventive liquid crystal display device.

By taking advantage of a reflection type hologram capable of diffracting a specific wavelength alone and transmitting light in other wavelength region, it is possible to set up an arrangement wherein a self-luminous type backlight 34 is located in combination with the back side of a diffuse reflection type hologram 31, as shown in FIG. 7. According to this arrangement the self-luminous type backlight 34 can be used to illuminate the hologram 31 with light 35 therefrom when the liquid crystal display device is used in a dark place. When the liquid crystal display device is used in the light, the self-luminous type backlight 34 is used at a reduced luminance or turned off, so that the hologram 31 can be illuminated with diffused and reflected light 33 of extraneous light 32. It is thus possible to extend the battery driving time of a portable computer or the like, with which a liquid crystal display device is used.

One example of how to make the diffuse reflection type hologram 31 will now be explained. This diffuse reflection type hologram is to backlight an STN liquid crystal display element.

Recording of Transmission Type Hologram Plate

Using the layout shown in FIG. 8 under the following conditions, one transmission type hologram is recorded for each wavelength, three such holograms in all.

Recording wavelength: 476.5 nm (Ar laser), 576 nm (Ar laser+Dye laser), and 647.1 nm (Kr laser)

Photosensitive material: 8E56 made by AGFA (476.5 nm, 576 nm) used : 8E76 made by AGFA (647.1 nm)

Exposure: 300 $\mu$m/cm$^2$ (476.5 nm, 647.1 nm) 500 $\mu$m/cm$^2$ (576 nm)

Recording of Reflection Type Hologram Plate

The aforesaid three transmission type holograms are used in the optical layout shown in FIG. 9 to record holograms of respective wavelengths on a single-layer dry plate formed of each of the following three photosensitive material films.

Recording wavelength: 476.5 nm (Ar laser), 576 nm (Ar laser+Dye laser), and 647.1 nm (Kr laser)

Figure 10:
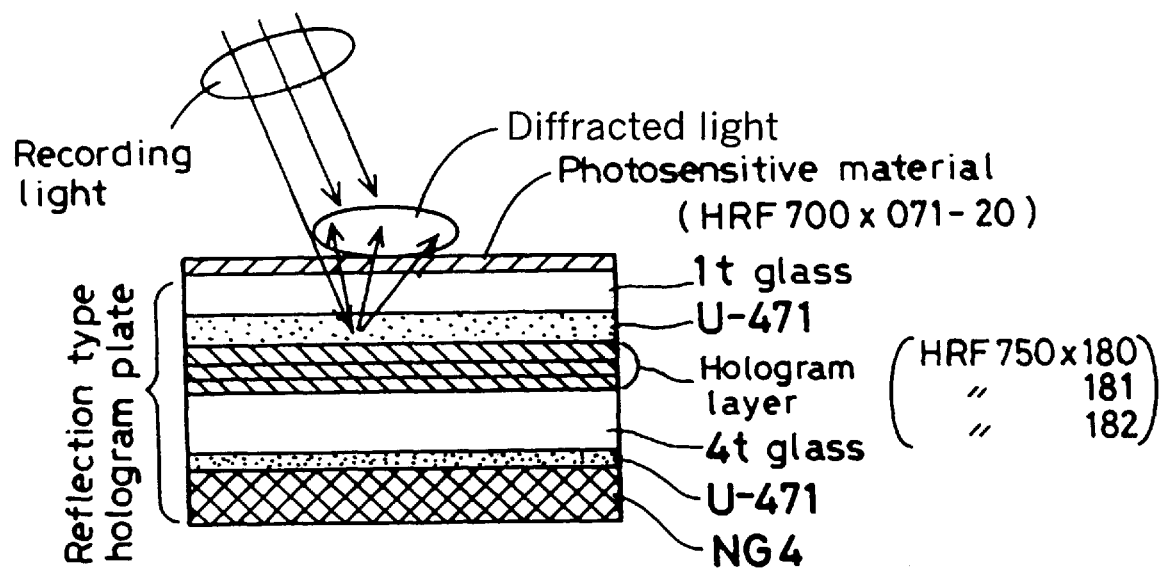
FIG. 10 illustrates one exemplary layer structure of a diffuse reflection type hologram plate and an optical layout for replication from the same.

Photosensitive : HRF750X180 (647.1 nm) made by Du Pont material used : HRF750X181 (576 nm) made by Du Pont : HRF750X182 (476.5 nm) made by Du Pont Exposure: 30 mJ/cm$^2$ per exposure After this, layer stacking is carried out by post-recording treatments, viz., irradiation with UV at 200 mJ/cm$^2$ and a 2-hour heating at 120° C., as shown in FIG. 10. That is, a layer structure is obtained, which is made up of 1t glass (of 1 mm in thickness), optical adhesive U-471 (made by Kyouritsu Kagaku Co., Ltd), three hologram film layers (HRF750X180, HRF750X181, HRF750X182), 4t glass (of 4 mm in thickness), optical adhesive U-471 (made by Kyoritsu Kagaku Co., Ltd.), and ND (neutral density) glass NG (of 4 mm in thickness and 1% in transmittance, and made by Shot).

Replication of Reflection Type Hologram Plate

As shown in FIG. 10, while a photosensitive film is brought into close contact with the it glass (of 1 mm in thickness) side of the aforesaid reflection type hologram used as a plate, recording light including three wavelengths is concurrently or successively incident on the photosensitive film to cause interference of diffracted light from the hologram layer with the incident light in the photosensitive film for replication.

Recording wavelength: 476.5 nm (Ar laser), 576 nm (Ar laser+Dye laser), and 647.1 nm (Kr laser)

Photosensitive material used: HRF700X71-20 made by Du Pont Exposure: 30 mJ/cm$^2$ per exposure Following this, post-recording treatments, viz., irradiation with UV at 200 mJ/cm$^2$ and a 2-hour heating at 120° C. are carried out to obtain the following layer structure.

Layer Structure of Back Side Plate of Liquid Crystal Display

In order from the liquid crystal side:

Polarizing plate (LL-(82)-18 made by Sunlit Co., Ltd.): 27 (FIGS. 1 & 2)

Adhesive layer (HJ-9150W made by Nitto Denko Co., Ltd.) Hologram

Color tuning film (GA2-RED made by Du Pont)

Adhesive layer (HJ-9150W made by Nitto Denko Co., Ltd.)

Aluminum deposited adhesive tape (FNS KESHI S50 mad by Rintech Co., Ltd.)

As shown in FIG. 6, the thus fabricated diffuse reflection type hologram 31 having the polarizing plate 27 was located on the backlight side of the liquid crystal display element 20 to thereby obtain a liquid crystal display device which can uniformly diffuse and reflect light incident at an angle of 20° from above within a range defined by an upward angle of about 20°, a downward angle of about 30°, and breadth-wise angles of about 300, and enables bright color displays to be presented in the light without recourse to any self-luminous type backlight.

While the inventive liquid crystal display device using a hologram has been described with reference to some embodiments, it should be understood that the present invention is in no sense limited to such embodiments, and many other modifications may be possible.

The hologram scatter plate according to the present invention comprises a transmission type hologram layer and a back side layer, as viewed from an incident side thereof. This hologram scatter plate is broken down into three types depending on where the scatter function is performed. As shown schematically in FIG. 11, a first type of the hologram scatter plate 53 comprising the transmission hologram layer 51 and the back side surface 52 allows only the transmission hologram layer 51 to have diffusion and diffraction functions and the back side surface 52 to be provided in the form of a mirror reflection layer (FIG. 11(*a*)); a second type allows the transmission hologram layer 51 to have diffraction function alone and the back side layer 52 to have a diffuse reflection function (FIG. 11(*b*)); and a third type allows the transmission type hologram 51 to have diffusion and diffraction functions and the back side layer 52 to have a diffuse reflection function (FIG. 11(*c*)). Note that reference numeral 62 represents illumination light.

In either case, a hologram that is of the volume phase yet transmission type is used for the hologram 51, and incident light 62 and light reflected at the back side layer 52 are diffracted through the transmission type hologram 51 in any desired direction.

Figure 11:
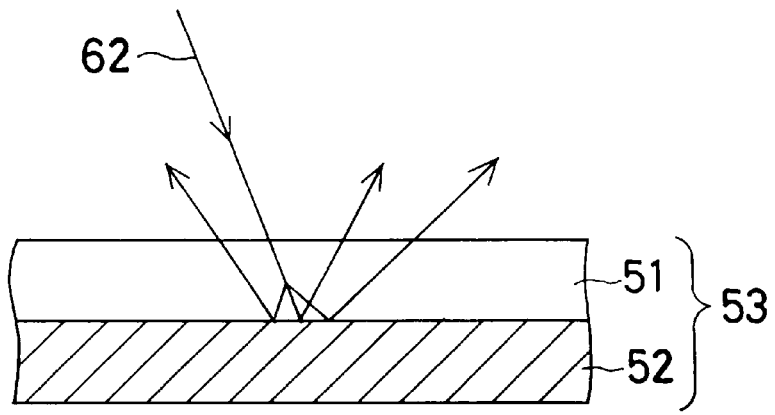
FIG. 11(a) to FIG. 11(c) illustrate schematically the construction and action of the hologram scatter plate according to the present invention.
Figure 11:
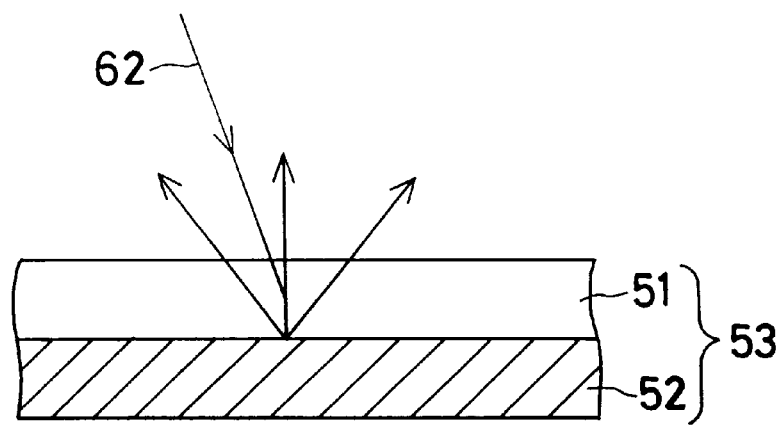
Figure 11:
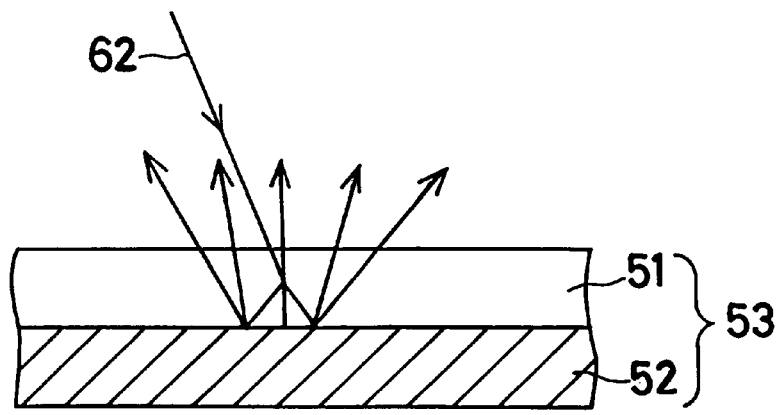
Figure 12:
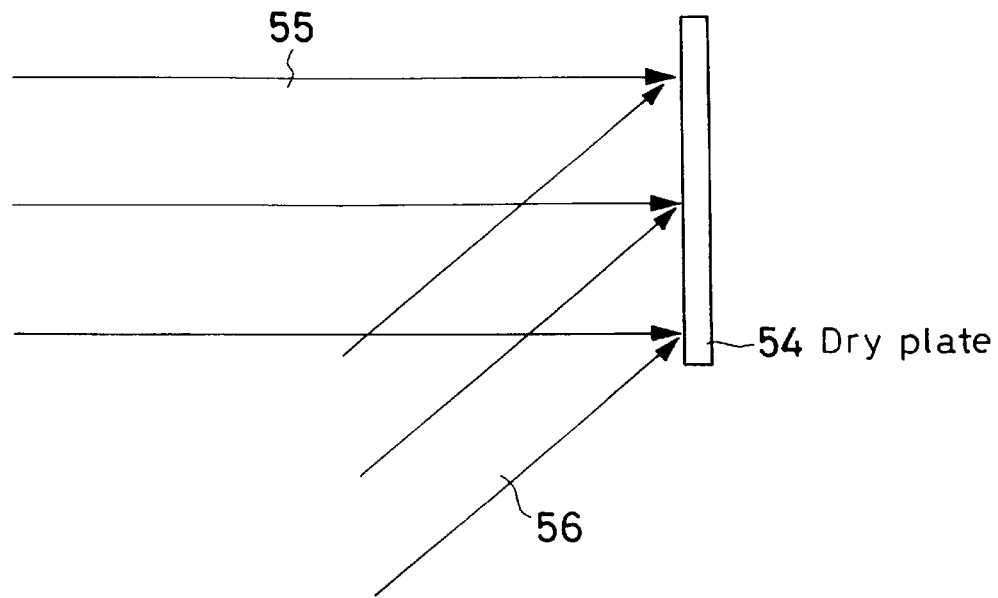
FIG. 12 illustrates a method of recording one transmission type hologram used in the present invention.
Figure 13:
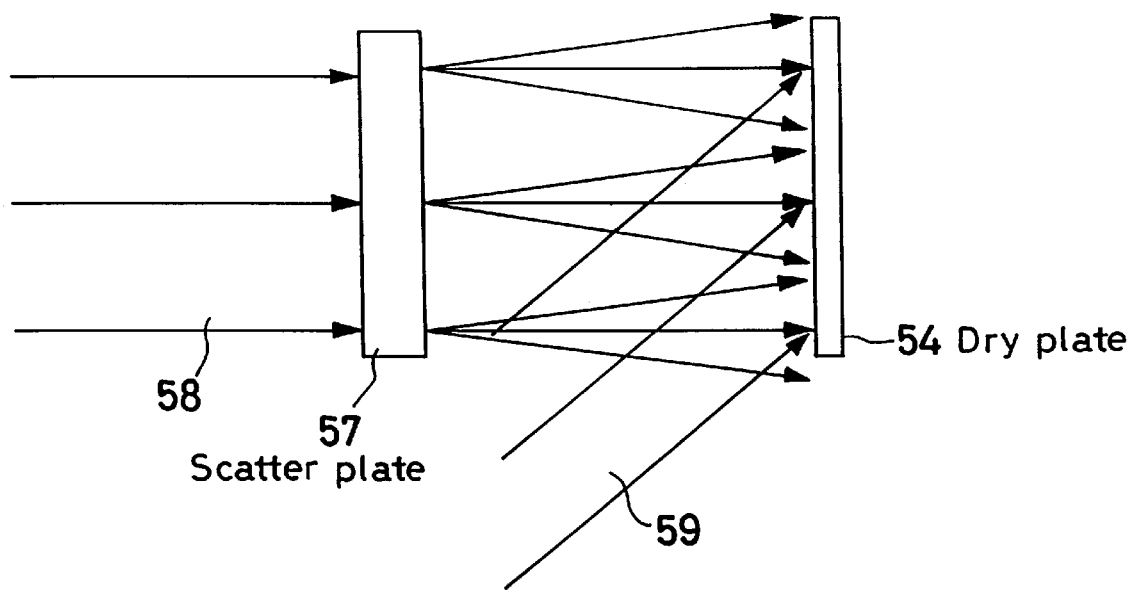
FIG. 13 illustrates a method of recording another transmission type hologram used in the present invention.

Referring now to how to make such a transmission type hologram 51 by means of holography, the hologram having diffraction function alone (FIG. 11(*b*)) is recorded on a dry plate 54 formed of photopolymer, etc., for recording a volume phase type hologram by permitting parallel object light 55 to be almost vertically incident on the dry plate 54 and parallel reference light 56 to be incident on the dry plate 54 from a direction corresponding to the direction of illumination light 62 for interference in the dry plate 54, as shown in FIG. 12. The hologram having both diffraction function and diffusion function (FIG. 11(*a*), (*c*)) is recorded on the dry plate 54 formed of photopolymer, etc., for forming a volume phase type hologram by locating a scatter plate 57 in front of the dry plate 54, permitting illumination light 58 to be incident on the scatter plate 57 to provide light scattered through the scatter plate 57 and directly transmitted light in the form of object light, while permitting parallel light incident from a direction corresponding to illumination light 62 to be incident on the dry plate 54 in the form of reference light 59 for interference purposes, as shown in FIG. 13.

The back side layer 52 herein used may be of the mirror reflection type wherein a reflecting metal such as aluminum, and silver is deposited on the upper or lower surface of a substrate film by means of evaporation or a metal foil is applied thereon. Alternatively, the back side layer 52 may be of the diffuse reflection type that is composed of a thin, mirror-finished metal plate. For instance, use may be made of a metal or other reflecting substrate subjected to surface matting, etc. to have a fine asperity pattern thereon, a substrate film having a scattering center therein and deposited on its back surface with a reflecting metal by means of evaporation or applied on its back surface with a metal foil, etc., a substrate film treated on one surface to have a fine asperity pattern and deposited on the other surface with a reflecting metal or applied thereon with a metal foil, etc., a photodiffusion film formed of a resin film which is coated or printed on one surface thereof with a photodiffusion ink having at least one fine particle dispersed therein, said at least one fine particle selected from the group consisting of an inorganic bead, an inorganic filler, an organic bead and a hollow bead, a photodiffusion film formed of a transparent resin in which said at least one fine particle is dispersed, or a known photodiffusion film having a reflecting metal deposited on its back surface by means of evaporation or a metal foil, etc. applied on its back surface.

Examples of the aforesaid substrate film having a scattering center, and the substrate film surface-treated to have a fine asperity pattern thereon are polyethylene (PE) film, uniaxially stretched polyethylene film, biaxially polyethylene film, stretched polypropylene (OPP) film, nonstretched polypropylene (CPP) film, ethylene-vinyl acetate copolymer (EVA) film, ionomer film, ethylene-ethyl acrylate copolymer (EEA) film, ethylene-acrylic acid copolymer (EAA) film, ethylene-methacrylic acid copolymer (EMAA) film, ethylene-methyl methacrylate copolymer (EMMA) film, ethylene-methyl acrylate copolymer (EMA) film, polyester film, nylon film, triacetylcellulose film, ethylene-vinyl alcohol copolymer (EVOH) film, polyvinylidene chloride (PVDC) film, biaxially stretched polyvinylidene chloride film, polyvinylidene fluoride film, polyacrylonitrile (PAN) film, polybutylene terephthalate (PBT) film, polyethylene terephthalate (PET) film, polyethylene terephthalate (PEN) film, amorphous polyethylene terephthalate (A-PET) film, polystyrene film, polyvinyl chloride film, polyvinyl alcohol film, polycarbonate (PC) film, polymethyl methacrylate (PMMA) film, polyurethane film, fluorocarbon resin film, polymethylpentene film, polybutene film, polyimide film, and polyacrylate film. Various co-extruded films may be used as well. These substrate films must be capable of supporting layer stacks, and so have a thickness of 1 $\mu$m to 500 $\mu$m, preferably 10 $\mu$m to 100 $\mu$m.

If required, an adhesive layer may be interleaved between the transmission type hologram layer 51 and the back side layer 52. The adhesive layer may contain adhesives such as elastomer adhesives, for instance, those based on natural rubber, reclaimed rubber, chloroprene rubber, nitrile rubber, styrene-butadiene rubber, and thermoplastic elastomers; synthetic resin adhesives such as those based on epoxy resin, and polyurethane; chemical reaction type adhesives such as those based on reaction type acrylic, and cyano acrylate; UV curable adhesives; EB curable adhesives; ethylene-vinyl acetate copolymer resin hot-melt adhesives; polyamide adhesives; polyester adhesives; thermoplastic elastomer adhesives; hot-melt adhesives such as reactive hot-melt adhesives; aqueous adhesives or water-soluble adhesives; emulsion adhesives; latex adhesives; and inorganic adhesives. For bonding, the thermoplastic adhesives may be cured by heating to a temperature higher than their softening points while they are interleaved between layers forming a stack; the UV and EB curable adhesives may be cured by irradiation with ultraviolet radiation, and electron beams while they are interleaved between layers forming a stack; and the tacky adhesives may be cured as such while they are interleaved between layers forming a stack.

Examples of the three hologram diffuse plates shown in FIG. 11 will now be explained.

Example 1 for Hologram Diffuse Plate

A hologram photosensitive material (Omnidex 352 made by Du Pont) was applied on a glass substrate to form a hologram recording dry plate. Using the optical system shown in FIG. 13 under the following conditions, hologram recording was carried out.

Laser wavelength: 514.5 nm (argon laser)

Reference light 59: 30° from normal of dry plate 54/parallel light

Object light: Vertical incidence of illumination light 58 on scatter plate 57/light transmitted and scattered through scatter plate 57

Exposure: 60 mJ/cm$^2$ (at an intensity of 1 mW/cm$^2$)

Intensity ratio between reference light 59 and object light: approximately 1:1

The obtained hologram was irradiated with ultraviolet radiation at 100 mJ/cm$^2$, and then heated at 120° C. for 2 hours to obtain the transmission type hologram 51. Applied on this hologram 51 was a mirror-finished, aluminum-deposited PET film (Metalumy TS #300 made by Toray Industries, Inc.) in the form of the back side layer 52, with a double-sided adhesive film (MC2000 made by Nitto Denko Co., Ltd.) interleaved between them, thereby obtaining the inventive scatter plate 53 (FIG. 11(*a*)).

Example 2 for Hologram Diffuse Plate

A hologram photosensitive material (Omnidex 352 made by Du Pont) was applied on a glass substrate to form a hologram recording dry plate. Using the optical system shown in FIG. 12 under the following conditions, hologram recording was carried out.

Laser wavelength: 514.5 nm (argon laser)

Reference light 56: 30° from normal of dry plate 54/parallel light

Object light 55: Vertical incidence/parallel light

Exposure: 60 mJ/cm$^2$ (at an intensity of 1 mW/cm$^2$)

Intensity ratio between reference light 56 and object light 55: approximately 1:1

The obtained hologram was irradiated with ultraviolet radiation at 100 mJ/cm$^2$, and then heated at 120° C. for 2 hours to obtain the transmission type hologram 51. Applied on this hologram 51 was a light-scattering back side film (FNS KESHI S50 made by Rintec Co., Ltd.) in the form of the back side layer 52, with a double-sided adhesive film (MC2000 made by Nitto Denko Co., Ltd.) interleaved between them, thereby obtaining the inventive scatter plate 53 (FIG. 11(*b*)).

Example 3 for Hologram Diffuse Plate

A hologram photosensitive material (Omnidex 352 made by Du Pont) was applied on a glass substrate to form a hologram recording dry plate. Using the optical system shown in FIG. 13 under the following conditions, hologram recording was carried out.

Laser wavelength: 514.5 nm (argon laser)

Reference light 59: 30° from normal of dry plate 54/parallel light

Object light: Vertical incidence of illumination light 58 on scatter plate 57/light transmitted and scattered through scatter plate 57

Exposure: 60 mJ/cm$^2$ (at an intensity of 1 mW/cm$^2$)

Intensity ratio between reference light 59 and object light: approximately 1:1

The obtained hologram was irradiated with ultraviolet radiation at 100 mJ/cm$^2$, and then heated at 120° C. for 2 hours to obtain the transmission type hologram 51. Applied on this hologram 51 was a light-scattering back side film (FNS KESHI S50 made by Rintec Co., Ltd.) in the form of the back side layer 52, with a double-sided adhesive film (MC2000 made by Nitto Denko Co., Ltd.) interleaved between them, thereby obtaining the inventive scatter plate 53 (FIG. 11(c)).

Example 4 for Hologram Diffuse Plate

A hologram photosensitive material (Omnidex 352 made by Du Pont) was applied on a glass substrate to form a hologram recording dry plate. Using the optical system shown in FIG. 13 under the following three sets of conditions, hologram recording was carried out.

First set of conditions

Laser wavelength: 488 nm (argon laser)

Reference light 59: 30O from normal of dry plate 54/parallel light

Object light: Vertical incidence of illumination light 58 on scatter plate 57/light transmitted and scattered through scatter plate 57

Exposure: 60 mJ/cm$^2$ (at an intensity of 1 mW/cm$^2$)

Intensity ratio between reference light 59 and object light: approximately 1:1

Second set of conditions

Laser wavelength: 550 nm (dye laser)

Reference light 59: 30° from normal of dry plate 54/parallel light

Object light: Vertical incidence of illumination light 58 on scatter plate 57/light transmitted and scattered through scatter plate 57

Exposure: 60 mJ/cm$^2$ (at an intensity of 1 mW/cm$^2$)

Intensity ratio between reference light 59 and object light: approximately 1:1

Third set of conditions

Laser wavelength: 647 nm (krypton laser)

Reference light 59: 30° from normal of dry plate 54/parallel light

Object light: Vertical incidence of illumination light 58 on scatter plate 57/light transmitted and scattered through scatter plate 57

Exposure: 60 mJ/cm$^2$ (at an intensity of 1 mW/cm$^2$)

Intensity ratio between reference light 59 and object light: approximately 1:1

Each of the thus obtained holograms was irradiated with ultraviolet radiation at 100 mJ/cm$^2$, and then heated at 120° C. for 2 hours to obtain a transmission type hologram. Three such holograms were stacked together with double-sided adhesive films (MC2000 made by Nitto Denko Co., Ltd.) interleaved between them. Applied on the backmost side of the stack was a light scattering back side film (FNS KESHI S50 made by Rintech Co., Ltd.) in the form of the back side layer 52, with a double-sided adhesive film (MC2000 made by Nitto Denko Co., Ltd.) interleaved between them, thereby obtaining the inventive scatter plate 53 (FIG. 11(c)).

While the hologram scatter plate according to this invention has been described with reference to some examples, it should be understood that the invention is never limited to these examples whatsoever, and so many other modifications may be possible.

A hologram, when used with a large liquid crystal display or a projector screen, must have a large area. To fabricate a large-area diffuse reflection type hologram, hologram plates must be joined together with joints recorded therein.

Figure 19:
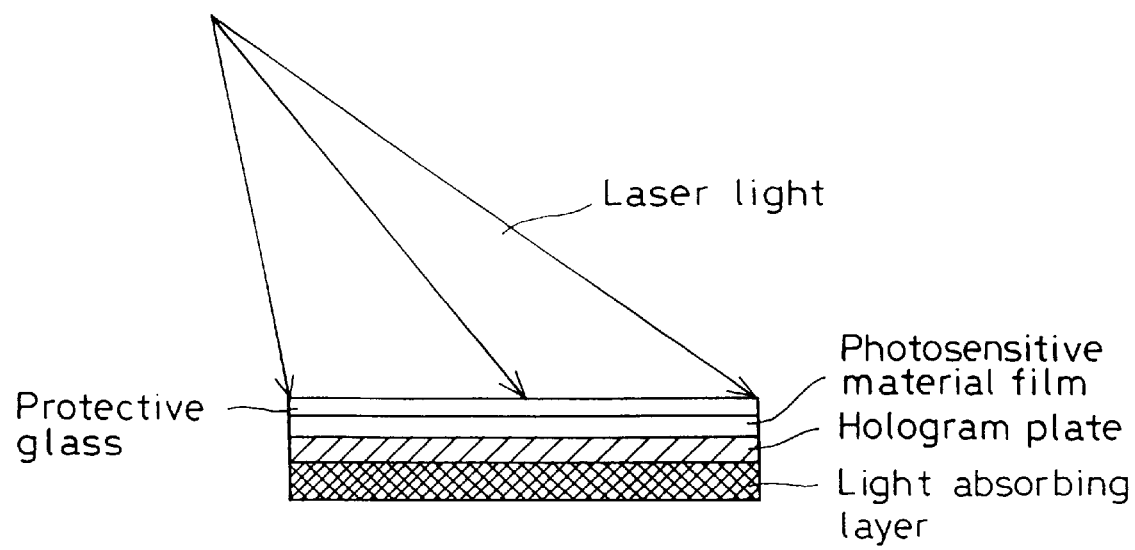
FIG. 19(a) to FIG. 19(b) illustrate a conventional layout for making a diffuse reflection type hologram by a replication technique.
Figure 19:
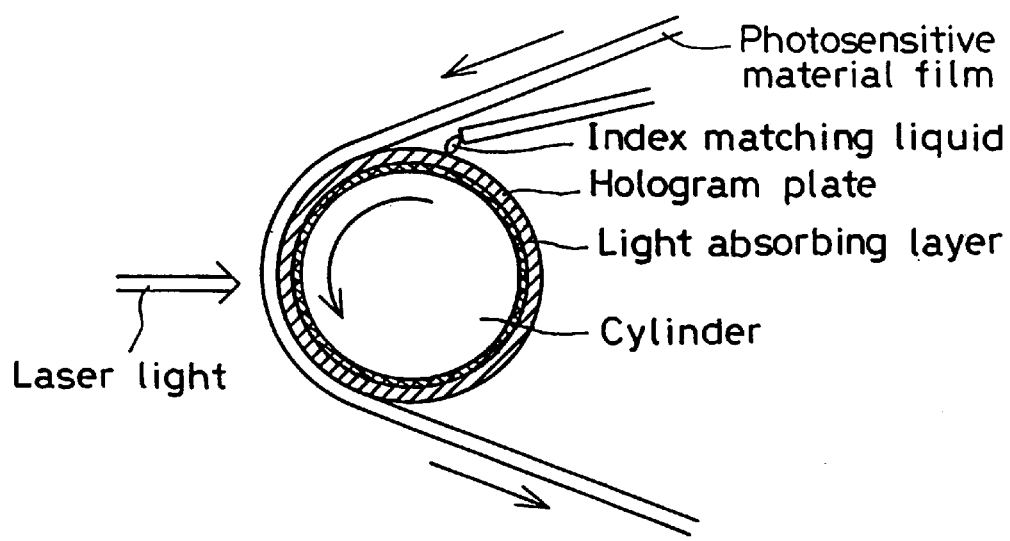

So far, a diffuse reflection type hologram has been fabricated by superposing a photosensitive material film on a surface of a plane plate form of diffuse reflection hologram backed with a light absorbing layer, stacking a protective glass on the photosensitive material film, and permitting laser light to be incident on the whole assembly from the protective glass so that the incident light, and light reflected and diffracted from the plate can interfere with each other in the photosensitive material film to thereby replicate the plate, as shown in FIG. 19(a), or winding a film form of diffuse reflection hologram backed with a light absorbing layer around a cylinder, winding a photosensitive material film around the hologram film in contact relation thereto, with an index matching liquid contained between them, and permitting laser light to be incident on a part of the hologram film such that it can cross the photosensitive material film at a position where the photosensitive material film comes into close contact with the hologram film, while rotating the cylinder in a direction shown by an arrow, whereby the incident light, and light reflected and diffracted from the hologram film can be made to interfere successively with each other to make the hologram film by replication, as shown in FIG. 19(b).

In the process shown in FIG. 19(a), however, the size of the diffuse reflection type hologram to be fabricated is limited to the size of the hologram plate used; that is, to fabricate a large-area diffuse reflection type hologram there is no option all but to join together a plurality of holograms. With the process shown in FIG. 19(b), a continuous diffuse reflection type hologram having a large area may be fabricated because the hologram film wound around the cylinder has joints therein. However, such joints remain recorded in the replicated hologram film.

In what follows, the inventive process of replicating a diffuse reflection type hologram used with liquid crystal display devices, etc. will be explained with reference to a specific embodiment.

Figure 14:
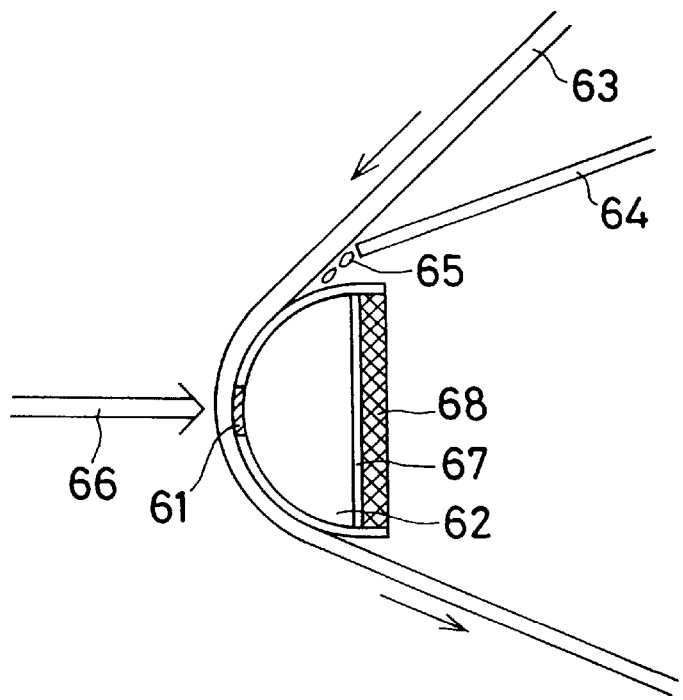
FIG. 14 illustrates a layout for carrying out the replication process of a diffuse reflection type hologram according to the present invention.
Figure 15A:
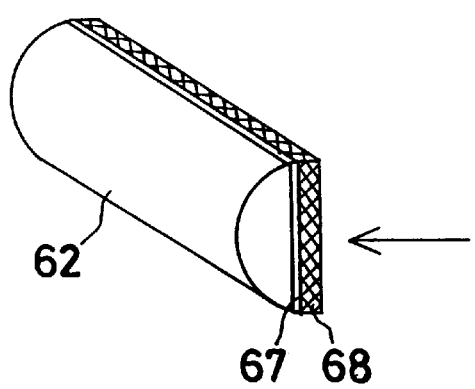
FIG. 15(a) to FIG. 15(c) illustrate how to assemble a hologram plate support used in the layout shown in FIG. 1.
Figure 15B:
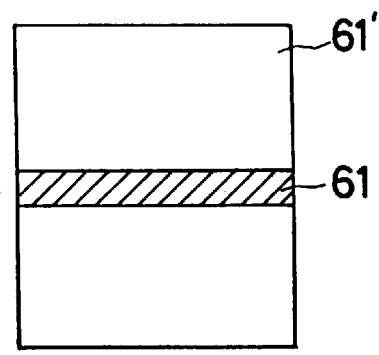
Figure 15C:
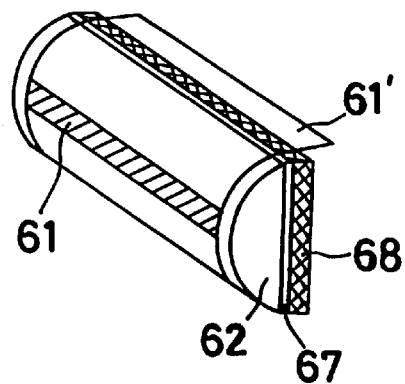

FIG. 14 illustrates one exemplary layout for carrying out the replication process according to the present invention, and FIG. 15 shows how to assemble a hologram plate support used in carrying out the same. In the present invention, a plate form of diffuse reflection hologram 61 to be replicated is applied, in striped forms, on the surface of a semicylindrical transparent member 62 in its generating line direction. A photosensitive material film 63 is brought into close contact with the hologram plate 61 while a droplet form of index matching liquid or lubricant 65 is fed between them through a dropping feeder 64. While the photosensitive material film 63 is slid in the circumferential direction of the transparent member 62 that crosses the striped form of hologram plate 61, it is fed in a direction shown by an arrow of FIG. 14. In this feeding process, at a position where photosensitive material film 63 is in close contact with the hologram plate 61, laser light 66 is permitted to be incident on the hologram plate 61 from the photosensitive material film 63 such that it crosses the photosensitive material film 63 and provides a full coverage to the longitudinal direction of the hologram plate 61. The incident light, and light reflected and diffracted from the hologram plate 61 are thus made to interfere successively with each other in the photosensitive material film 63, so that a large diffuse reflection type hologram that is continuously extended in the moving direction of the photosensitive material film 63 can be fabricated by replication.

An absorbing glass 68 is applied on the plane back side of the semicylindrical transparent member 62, with an adhesive layer 67 interleaved between them, for the purpose of preventing interference of the incident light with reflected light obtained by internal reflection at this plane of laser light 66 transmitted through the hologram plate 61, which may otherwise cause unnecessary interference fringes to be recorded. Instead of this, an absorbing layer may be provided on the back side of the hologram plate 61.

To apply the hologram plate 61 on the semicylindrical surface of the semicylindrical transparent member 62, an absorbing glass 68 is applied on the back side of the semicylindrical transparent member 62, as shown in FIG. 15(*a*). Alternatively, a rectangular recording film 61' is previously made, which has the hologram plate 61 recorded on a transversely striped middle region thereof and has a width smaller than the length of the transparent member 62, as shown in FIG. 15(*b*). Then, this recording film 61' may be applied on the semicylindrical surface of the semicylindrical transparent member 62, as shown in FIG. 15(*c*). In the layout shown in FIG. 14, it is to be noted that the axis (generating line) of the semicylindrical transparent member 62 may be directed either horizontally or vertically.

Figure 16:
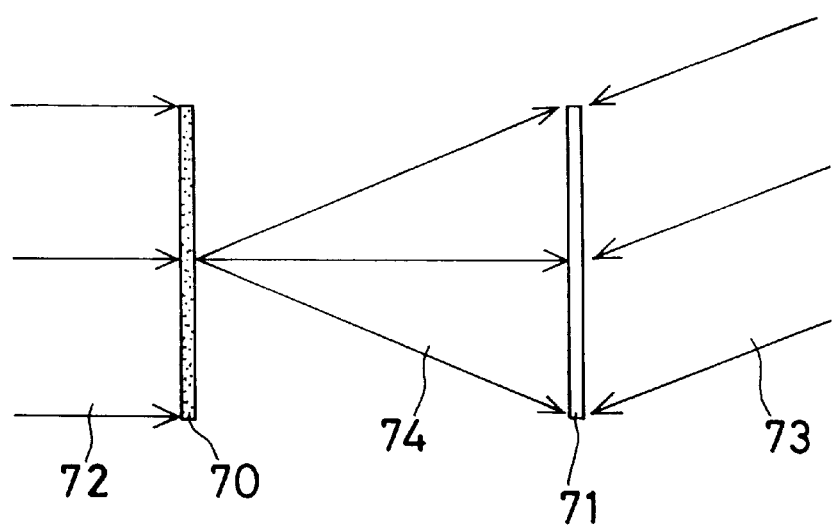
FIG. 16 illustrates how to make a diffuse reflection type hologram plate by means of the single-step holography technique.
Figure 17A:
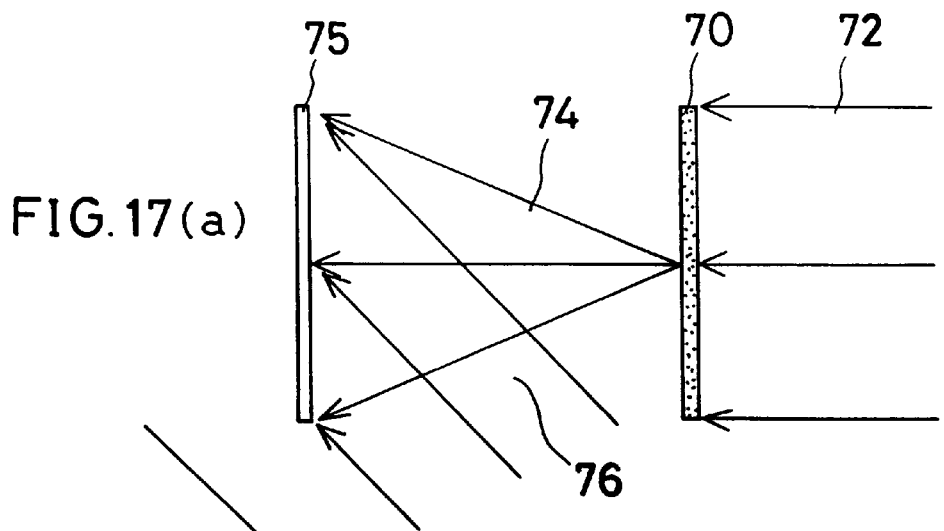
FIG. 17(a) to FIG. 17(b) illustrate how to make a diffuse reflection type hologram plate by means of the two-step holography technique.
Figure 17B:
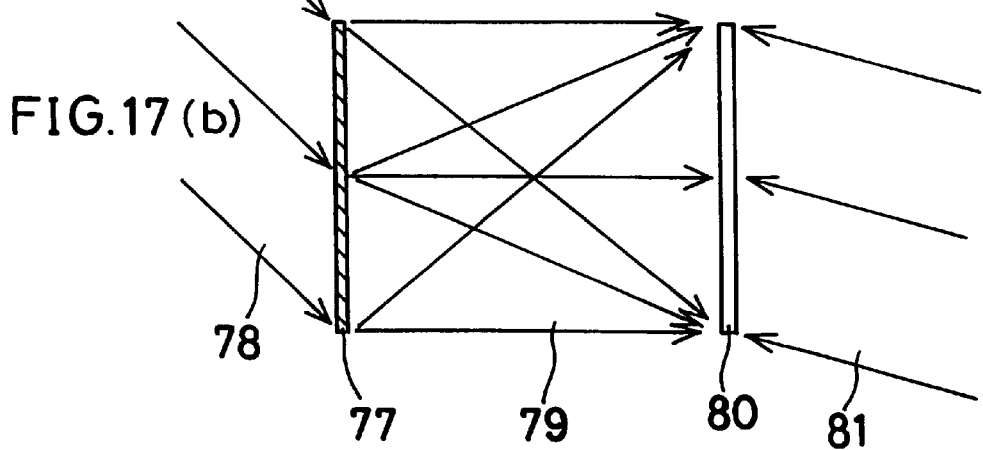

Available for the fabrication of the diffuse reflection type hologram 61 are some methods, two of which are shown; FIG. 16 illustrates a single-step holography method and FIG. 17 depicts a two-step holography method. According to the single-step holography method shown in FIG. 16, a reflection type of hologram dry plate 71 formed of photopolymer as an example (a Lippmann hologram dry plate) is located at a predetermined diffuse reflection region with respect to a scatter plate 70 formed typically of frosted glass. The scatter plate 70 is illuminated from its back side with one coherent light 72 of given wavelength obtained by halving light emanating from the same light source so that scattered light 74 or object light leaving the front side of the scatter plate 70 can be incident on the reflection type of hologram dry plate 71. At the same time, another coherent light 73 of given wavelength emanating from the same light source or reference light is incident on the opposite side of the dry plate 71, said reference light propagating opposite to light assumed to be incident on the diffuse reflection type hologram plate 61, so that the diffuse reflection type hologram plate 61 can be recorded on the reflection type of hologram dry plate 71.

According to the two-step holography method shown in FIG. 17, a transmission type of hologram dry plate 75 is located at a predetermined diffuse reflection region with respect to a scatter plate 70 formed typically of frosted glass, as shown in FIG. 17(*a*). The scatter plate 70 is illuminated from its back side with one coherent light 72 of given wavelength obtained by halving light emanating from the same light source, so that scattered light 74 leaving the front side of the scatter plate 70 or object light can be incident on the transmission type of hologram dry plate 75. At the same time, another coherent light 76 of given wavelength emanating from the same light source or reference light is incident on the same side of the dry plate 75 at any desired angle, so that a first or transmission type hologram can be recorded on the transmission type of hologram dry plate 75.

Then, this first hologram, shown at 77 in FIG. 17(*b*), is located at the position of the former transmission type of hologram dry plate 75, and a reflection type of hologram dry plate 80 is now located at the position of the scatter plate 70. The hologram 77 is irradiated with reconstructing illumination light 78 that is opposite in the direction of propagation to, and the same in wavelength as, the recording reference light 76 such that a real image of the hologram 77 can be formed at a position of the reflection type of hologram dry plate 80 (corresponding to the position of the scatter plate 70 shown in FIG. 17(*a*)), whereupon diffracted light 79 from the hologram 77 or object light is incident on the reflection type of hologram dry plate 80. At the same time, reference light 81 that propagates opposite to incident light assumed for the diffuse reflection type hologram 61 is incident on the opposite side of the reflection type of hologram dry plate 80, whereby a second or diffuse reflection type of hologram plate is recorded on the reflection type of hologram dry plate 80. In this way, it is possible to fabricate the diffuse reflection type hologram plate 61 with a viewing region limited to the range of the first hologram 77.

It is here to be noted that instead of the thus fabricated hologram plate 61, a hologram plate fabricated from the same by contact replication, too, may be used.

One illustrative example of the inventive replicating process will be explained. An adhesive layer 67 formed of U-471 made by Kyoritsu Kagaku Co., Ltd. was applied on a semicylindrical glass block 62, using NG4 made by Shot Co., Ltd. as an absorbing glass 68. Then, a hologram plate 61 was fixed on the glass block 62 with an index matching liquid made of xylene contained between them. The hologram plate 61 used was optically characterized in that light incident upwardly on the recording surface at an angle of incidence of 20° with respect to the normal line thereof can be diffused and reflected within a range defined by an upward angle of 20°, a downward angle of 20° and breadthwise angles of 30° with respect to the normal line. While a roll form of photosensitive material film 63 was slid on the surface of the hologram plate 61 applied on the semicylindrical glass block 62, using an index matching liquid again formed of xylene as lubricant, the hologram plate 61 was irradiated through the roll form of photosensitive material film 63 with laser light 66 controlled by a cylindrical lens such that it diverges only in the generating direction of the glass block 62, whereby the laser light, and diffracted light from the hologram plate 61 could be made to interfere with each other to achieve continuous recording of the diffuse reflection type hologram on the photosensitive material film 63.

The inventive diffuse reflection type hologram replication process has been described with reference to some examples, it should be understood that the present invention is by no means limited to such examples at all, and so many other modifications may be made.

As can be seen from the foregoing explanations, according to the first inventive liquid crystal display device using a hologram wherein on a display surface side of a liquid crystal display element or between a liquid crystal display element and a backlight there is provided a diffuse transmission type hologram capable of diffusing and transmitting light incident from a specific direction only in a direction defined as a viewing region, it is possible to make wide a visual field region where displayed images can be observed and reduce luminance drops, so that bright displayed images can be presented. It is here to be noted that the present invention may be modified such that the visual field range can be arbitrarily set to observe images only in a plurality of different directions, and it is not always required to locate a scatter plate on the backlight side.

According to the second inventive liquid crystal display device using a hologram wherein on a back surface side of a liquid crystal display element opposite to a display surface side thereof there is provided a diffuse reflection type hologram capable of diffusing and reflecting light incident from a specific direction only in a direction defined as a viewing region as mentioned above, it is possible to present bright displays in the light without recourse to any self-luminous type backlight.

According to the inventive hologram scatter plate wherein a transmission type hologram layer and a back side layer are stacked together in the described order, it is possible to limit the direction of diffraction and scattering by means of the transmission hologram and increase reflectance over a wide wavelength region by means of the back side layer, so that diffused light having high luminance can be obtained over a wide wavelength and viewing angle range, so making bright displays, etc. possible. It is here to be noted that the transmission type hologram layer, if it has diffraction function, or diffusion function and diffraction function, with respect to a plurality of different wavelengths, especially, three wavelengths in R, G and B regions, can then present displays brighter (three times as bright on calculation) than those obtained with a hologram layer having diffraction function, or diffusion function and diffraction function, with respect to a single wavelength.

According to the inventive diffuse reflection type hologram replication process wherein while a photosensitive material film is slid on a fixed diffuse type hologram plate in contact relation thereto, the hologram plate is irradiated from the photosensitive material film with a light beam of linear section that becomes wide in a widthwise direction of the film, so that a diffuse reflection type hologram can be continuously recorded in the photosensitive material film by interference of the incident light beam with a light beam reflected and diffracted by the diffuse reflection type hologram plate, it is possible to easily fabricate, with no need of using any large hologram plate, a large yet continuous film form of diffuse reflection type hologram having neither joints nor recorded joints therein, which has high reflectance and quality, and so is best suited for use with backlights, projector screens, combiners, etc. for liquid crystal display devices.

What we claim is:

1. A liquid crystal display device using a hologram, characterized in that between a liquid crystal display element and a backlight there is located a diffuse transmission type hologram optically configured to diffuse and transmit white light therethrough from light that is incident on said hologram from a specific direction, said hologram diffusing and transmitting light in a direction defined as a viewing region, wherein said hologram transmits white light symmetrically about a line of incidence through a planar surface of the hologram.

2. The liquid crystal display of claim 1, wherein said hologram transmits said white light without substantial color component separation.

3. The liquid crystal display of claim 2, wherein the hologram transmits white light symmetrically about a normal line to the planar surface of the hologram.

4. The liquid crystal display of claim 2, wherein the hologram operably diffuses and transmits light in a region bounded by an imaginary plane, wherein the region is larger than a planar region of the hologram.

5. A hologram scatter plate which reflects incident light in a direction different from a direct reflection direction, characterized in that a transmission type hologram layer and a back side layer are stacked together in the described order as viewed from an incident side thereof, wherein the transmission type hologram layer has both a diffusion function and an off-axis diffraction function while the back side layer is a mirror reflection layer and has no diffusion and diffraction functions.

6. A hologram scatter plate which reflects incident light in a direction different from a direct reflection direction, characterized in that a transmission type hologram layer and a back side layer are stacked together in the described order as viewed from an incident side thereof, wherein the transmission type hologram layer has an off-axis diffraction function while the back side layer has a diffuse reflection function.

7. A hologram scatter plate which reflects incident light in a direction different from a direct reflection direction, characterized in that a transmission type hologram layer and a back side layer are stacked together in the described order as viewed from an incident side thereof, wherein the transmission diffraction type hologram layer has both diffusion function and an off-axis function while the back side layer has a diffuse reflection function.

8. The hologram scatter plate according to any one of claims 5 to 7, characterized in that the transmission type hologram layer has a different respective diffraction function, or diffusion and diffraction function, for different respective wavelengths.

9. A liquid crystal display device, characterized by having the hologram scatter plate according to claim 8 located on a back surface side of a liquid crystal display element.

10. A liquid crystal display device, characterized by having the hologram scatter plate according to any one of claim 5 to 7 located on a back surface side of a liquid crystal display element.

* * * * *